Dec. 26, 1939.  E. R. CAPITA  2,184,282

METHOD AND APPARATUS FOR SECURING ELEMENTS TOGETHER

Filed July 26, 1935   2 Sheets-Sheet 1

Inventor
Emil R. Capita
by
Walter J. Kaufman
Attorney

Dec. 26, 1939. E. R. CAPITA 2,184,282
METHOD AND APPARATUS FOR SECURING ELEMENTS TOGETHER
Filed July 26, 1935 2 Sheets-Sheet 2
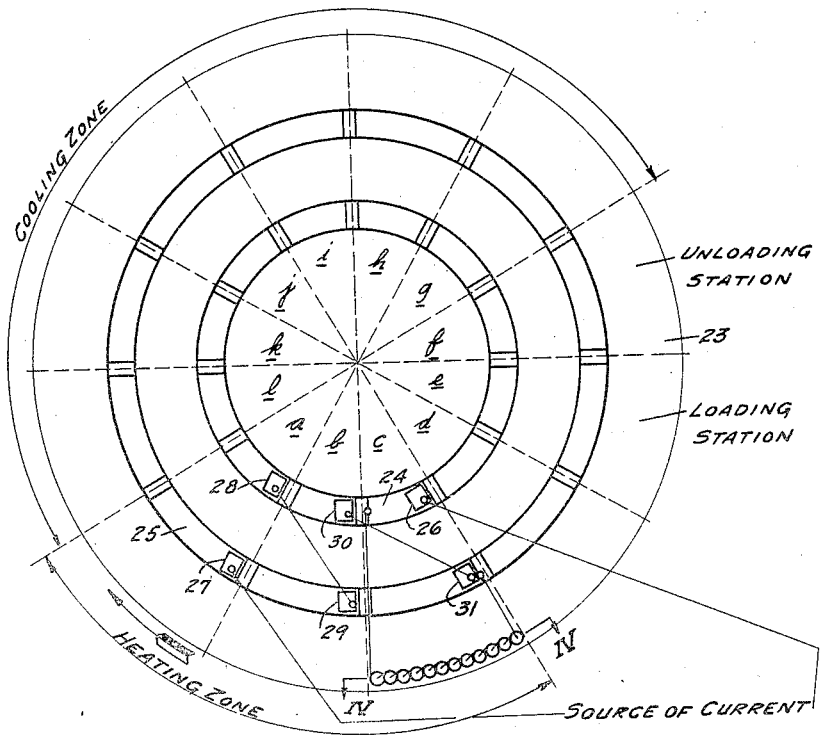
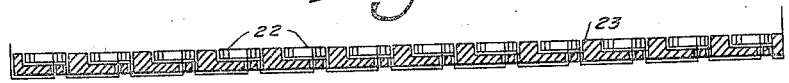
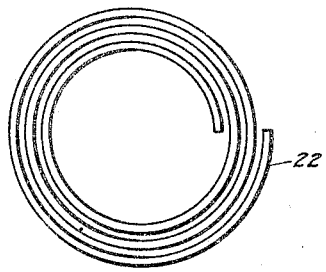
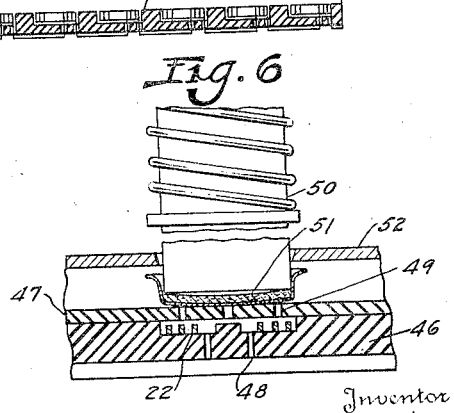

Patented Dec. 26, 1939

2,184,282

UNITED STATES PATENT OFFICE 2,184,282

METHOD AND APPARATUS FOR SECURING ELEMENTS TOGETHER

Emil R. Capita, New York, N. Y.

Application July 26, 1935, Serial No. 33,336

24 Claims. (Cl. 219—11)

This invention relates to a method and apparatus for securing elements together, at least one of which is susceptible to heating by induced electrical current, and more particularly to a method and apparatus for securing sealing elements to closures, in which the closure shell is of material, such as tinplate, which may be readily heated by induced electrical current, and also contemplates the adhesion of spots to liners in closures wherein the spot is made of conducting material capable of being inductively heated.

According to a preferred embodiment of this invention, a liner, spot or gasket is secured to a closure shell, or to a sealing element, in the case of a spot, by means of heat electrically induced and generated within one of the parts. The heat so generated may be effective for causing softening of an adhesive lacquer coating, coagulating and setting a heat coagulable adhesive, or may be effective for setting a heat convertible binder for a plastic mass incorporated in or carried by one of the parts, such for example as vulcanizing a rubber disk, washer or gasket or flowed in composition layer which, upon vulcanization or setting, may serve as a sealing liner. It will be understood, therefore, that the term "securing elements together" shall include the setting or vulcanization of a plastic or flowable mass (as well as a preformed element) in situ within or upon a conducting element.

This invention contemplates a method and apparatus in which the induction heating of the conducting element is effected while the element is in movement and the field of electrical current from a suitable establishing means, such as a coil is moved—preferably in fixed relationship with respect to the element to be heated—and in which the coil is so formed and positioned that heating of the conducting element is limited to a specific or predetermined portion thereof. In a more specific sense, this invention embodies a method and apparatus wherein the high frequency current, supplied to a coil or other establishing means adapted to move in fixed relationship to an element to be inductively heated, is commutated in order that the supply of current to the coil may be effectively and closely controlled.

In prior attempts to secure sealing liners or gaskets to closures by means of heat, serious difficulties have been encountered by reason of the softening of the decorations applied to the closures, inasmuch as the heat has not been readily controllable. The heating has been generally effected while the closures are intermittently moved along a support; the heat not only softening or setting the adhesive but also softening the decoration to some extent, at which time the decoration has been susceptible to scarring or removal. Other difficulties have arisen by reason of the discoloration of applied decorations, particularly light colored decorations, from the flames employed; and from the lack of control of the precise amount of heat required to effect a union. Further disadvantages reside in the inability to apply the heat only to the portion of the closure where it is required to effect a union between the parts sought to be united.

The assembly of closures has been relatively slow in prior systems because of the inability of the prior art mechanisms to impart sufficient heat in a relatively short time without scorching or discoloring the decoration and without marring or removing the decoration by the means employed to move the closures over or along the heating zone. Finger bars, for example, reciprocating intermediate adjacent closures and moving them forwardly while the closures are being heated, are prone to skin the marginal decorations from the closures. The speed of the machines of this type is determined entirely by the length of the heating zone, since the heating is effected by passing the closures through the zone. In order to obtain a high speed assembly with prior art machines, the heating zone must be relatively long, thus consuming valuable floor space. Furthermore, the prior art machines are not capable of close control or adjustment whereby the degree and time of heat for different types of adhesives may be readily obtained in succeeding production runs. The foregoing disadvantages are obviated by the present invention and advantages are derived which will later become apparent.

My invention is particularly adapted for use in connection with a machine such as described and claimed in a copending application of Ralph R. Clark, Serial No. 72,489, filed April 3, 1936, wherein the method and apparatus is specifically illustrated in connection with the assembly of crown closures. In another copending application of Ralph R. Clark, Serial No. 33,205, filed July 26, 1935, the method of securing liners, and spots and the setting of heat setting or vulcanizible plastics, to serve as sealing liners, by induction heating is illustrated and described and broadly claimed.

In order that my invention may be readily and clearly understood, I will describe a preferred embodiment thereof in connection with the accompanying drawings, in which:

Figure 1 diagrammatically illustrates the present preferred circuit for supplying electrical energy and its connection to the heating elements;

Figure 2 illustrates a closure in conjunction with a preferred form of heating or radiating coil;

Figure 3 diagrammatically illustrates a mechanism for transporting closures in conjunction with the radiators or heating elements;

Figure 4 is a sectional view taken on the line IV—IV of Figure 3;

Figure 5 is a top plan view of the preferred form of heating coil; and

Figure 6 is a sectional view illustrating a pressure applying mechanism, of the type disclosed in the Clark application above referred to, for affixing sealing liners to crowns.

I prefer to use the heating effect produced in a metallic body by a high frequency electrical field. Certain limitations arise in the application of high frequency electrical fields in that parts of the mechanism are advantageously made of metal and should not be "hot" to the discomfiture of operators on the machine. The exposed machine parts are preferably ground potential. It is of some importance that the articles to be heated be disposed closely adjacent the energy coil in order to confine the field as much as possible to avoid losses and to direct and control the field as much as possible.

When employing my invention in a crown assembly machine of the type referred to in the Clark application above referred to, I prefer to employ for energizing the radiating coils, the symmetrical circuit illustrated and described in my copending application, Serial No. 33,337, filed July 26, 1935, entitled Heating apparatus and supply therefor.

Figure 1:
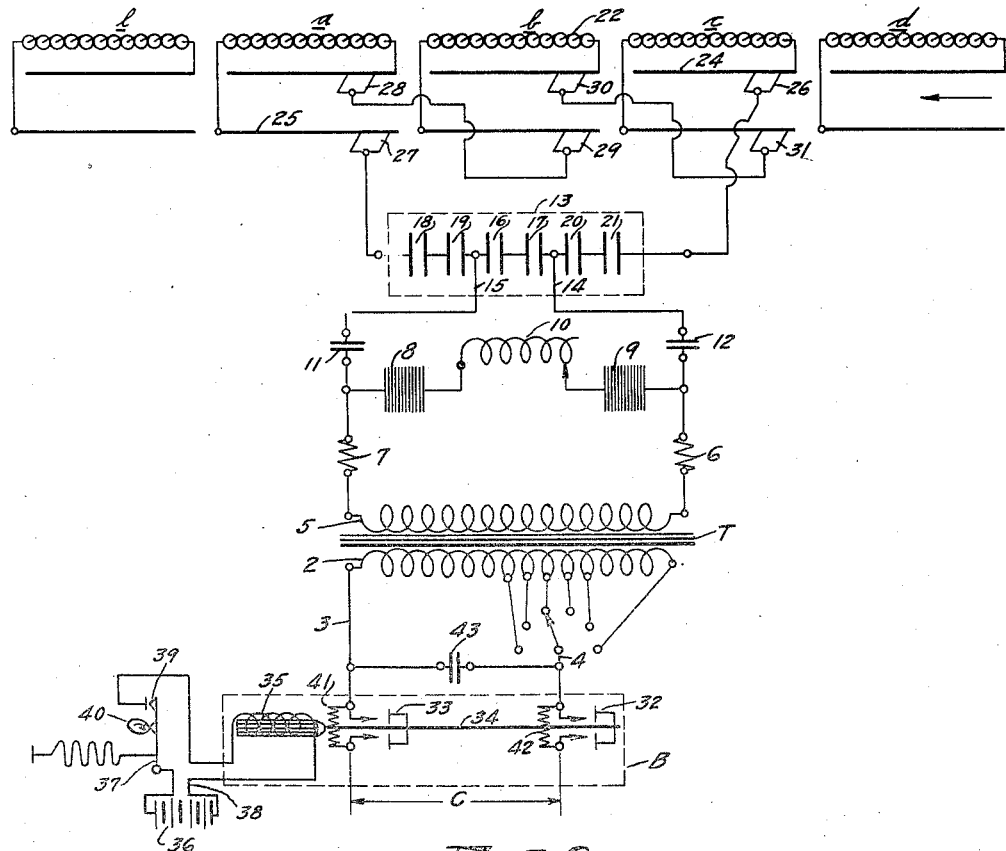

This circuit is diagrammatically shown in Figure 1 and comprises a circuit having a theoretical zero potential through its axis of symmetry whereby the electrical stresses, which would result · were one side of the oscillatory circuit grounded, are avoided. In a machine of the Clark type, above referred to, the mechanism is, in general, grounded and a circuit should be utilized which will avoid electrical losses by confining the field and preventing arcing with the grounded metal parts.

The circuit comprises an input transformer T having a tapped primary 2, supplied with electrical energy through leads 3 and 4 from a suitable low frequency source of current C. Breakers B are shown intermediate the source C and the primary 2 and will be more fully hereinafter described. The secondary 5 of the transformer T has a relatively high potential and is connected through damping resistors 6 and 7 to a symmetrical, split, quenched spark gap having sections 8 and 9 thereof connected by a variable inductance 10. The ends of the gap are connected through equal blocking condensers 11 and 12 to a tank condenser 13, connection being made through leads 14 and 15 to condensers 16 and 17 which are connected in series, forming part of the tank condenser 13; it being my preference that leads 14 and 15 be of equal potential but of opposite sign during the operation of the oscillatory circuit. The secondary circuit for the high frequency current comprises coils 22 and the tank condenser 13 in series with them. Sections 16, 17, 18, 19, 20, and 21 of the tank condenser 13 are in series in order to facilitate tapping to effect capacity coupling between the primary and secondary high frequency circuits.

The circuit and its operation is more particularly illustrated and described in my said copending application and a more detailed description will not, therefore, be given. For operation of the device and method of my invention, it will suffice if the current be of sufficient intensity and of such frequency that the coils will be effective for inducing sufficient current in a conducting element to satisfactorily heat the element to the desired temperature. Of course, in a machine of the Clark type, the preferred circuit of my said application is desirable. Other systems may be employed for generating high frequency current provided adequate safeguards be provided in the machine to prevent excessive losses and heating of the machine parts.

The high frequency current is fed to heating coils 22 which are connected in series and which, as diagrammatically shown in Figures 3 and 4, may be mounted for rotation on a disk 23. In order that the radiators 22 be energized for a predetermined portion of the cycle of the disk 23 and remain uncharged for another portion of the cycle, groups of coils 22 are connected to commutator bars, each group being connected to a segmental portion of commutator bars 24 and 25.

As an example, with a disk having positions for 144 heating units thereon, it may be found desirable to have twelve sections on the disk, each section comprising a group of twelve coils. In Figure 1 groups $a$, $b$, $c$, $d$, and $l$ are illustrated. The individual coils of each group are connected in series and each group is connected to a segment of each of the commutator bars 24 and 25; each segment being of the same length and each occupying a predetermined position on the disk 23.

Current is supplied from the high frequency generator to the segments through brushes 26 and 27; the brushes 26 and 27 being so spaced that they supply energy to a predetermined number of segments, which in the present embodiment is three. The intermediate groups of coils are connected in series by means of brushes 28 and 29, and 30 and 31, whereby a total of thirty-six coils are at all times in series connection; the brushes being stationary and feeding current to the coils 22 through the commutator bars 24 and 25 upon rotation of the disk and the bars thereabout.

The positioning of the brushes 26 and 27 determines the length of the heating zone, and may be varied to suit individual heating requirements and speed of operation.

Now referring to Figure 3 it will be observed that the brushes are shown in such position that sections $a$ to $c$ are energized and that, with the disk 23 travelling in the direction of the arrow, section $d$ will be next energized. So long as section $a$ is receiving current, section $d$ will not be energized, but immediately section $a$ moves past brushes 27 and 28, brushes 26 and 31 will engage the commutator segments of section $d$, thereby completing the circuit for that section; it being borne in mind that the coils and commutator bars revolve as a unit about the brushes which are fixed on the machine. By this system, each individual coil is energized for the same period of time regardless of the position it assumes in the group.

In order that the elements to be heated be positioned adjacent the field establishing means prior to the energization of any given group of coils, the elements are preferably loaded in position in advance of the heating zone, a distance equivalent to a segment, which in the illustrated embodiment is the space between twelve coils. The elements are preferably fed in single series as shown in the Clark application and the loading for any given group is complete prior to the application of current to that group, thus assuring that all of the elements will be subjected to the high frequency field for the same period of time. Current, of course, is applied to any given group so long as the brushes are in contact with their commutator bar segments.

When operating upon certain types of elements, such for example as crown shells in which a sealing liner is to be secured by means of an interposed adhesive lacquer, it is desirable to heat and after softening of the adhesive to cool under pressure. When this cooling is desired the disk 23 is made of sufficient diameter to provide a cooling zone intermediate the heating zone and the unloading position. As shown in Figure 3 where sections a to c are under heat, sections l, k, j, i, h, and g are being cooled and unloaded at section f, while new elements are being inserted at section e. If no cooling zone is required, the heating zone may be extended to cover additional sections and the speed of revolution increased or the elements may be unloaded at any position intermediate the heating zone and loading station depending upon existing conditions.

It has been found in commercial production that there is a tendency for the brushes to arc to segments; arcs being thrown from the brush to the next oncoming segment of the commutator bars as they approach the brush. This results in burning of the leading edges of the commutator bars of each section, and in order to overcome this, the breaker mechanism shown in Figure 1 is employed.

The breaker is positioned between the source of current C and the primary 2 of the input transformer T and comprises a pair of switches 32 and 33 connected to an arm 34 controlled by a solenoid 35 which is supplied with energizing current by a battery 36. The switches 32 and 33 are normally closed, but are shown in open position in Figure 1. The source of current 36 is fed to the solenoid by leads 37 and 38 and lead 37 is provided with a contact switch 39 which is shown in open position in Figure 1. The switch 39 is controlled by a cam 40 which is geared to the disk 23 and rotates in unison therewith. The shape of the cam 40 and the speed of rotation thereof is so determined that the switch 39 is opened immediately prior to the time when each commutator segment is leaving the brush and is closed after the brush is in engagement with the next succeeding segment, thus insuring that the breakers will be open during the time when a segment leaves a brush and the next succeeding segment immediately approaches and engages the brush. When the breakers 32 and 33 are open, resistors 41 and 42 are connected across the leads from the source of current C to the primary 2 and result merely in a diminution of current supplied to the primary, the current supplied through the resistors being insufficient to cause the gaps to strike, thus obviating arcing across the adjacent commutator sections. Thus the charging current for the core of the transformer T is flowing when the breakers are open, and hysteresis losses are minimized and surges are avoided. A condenser 43 of proper capacity is connected across the primary 2 for smoothing the action of the breakers 32 and 33.

Figure 2:
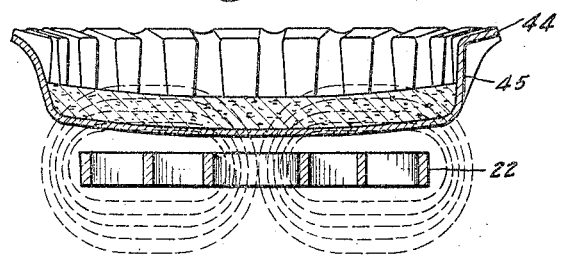

In Figure 2, I have illustrated to enlarged scale a cross sectional view of a closure 44 and my preferred type of coil 22. The coil 22 is shown in plan in Figure 5 and comprises a spiral conducting element having turns spaced for the passage of cooling air, and having a generally open center to avoid self-heating; the number of turns along any radius being substantially equal to produce an even field for the generation of an even heating effect in an element to be heated.

As shown in Figure 2, the flux F from the coil 22 threads the closure 44 through the top thereof and it will be observed that the skirt 45 is substantially unaffected by the flux F. I have found, as a matter of fact, that it is possible to melt the top from a standard tin plate closure without materially affecting the decoration applied to the skirt thereof. This latitude of control in a heating effect is of considerable importance, making my method and apparatus available for many types of adhesives and many types of lining compositions. It will be observed by a study of Figure 2 that the most intensive heating effect in the top of the closure 44 is in the center portion thereof; it being observed that the flux adjacent the skirt is distributed over a greater area than the same flux threading the center part. This is desirable in that adhesive applying mechanisms, as currently available, normally apply the adhesive in the center of the top of the closure. Other spacing of the coil 22 and the closure 44 will result in other distribution of the flux and various effects can be obtained as desired. The design of my coil, however, permits very close spacing between the coil and the element to be heated, which permits heating with a power input greatly diminished from that which would be required for the same heating effect with the element and coil spaced further apart; the field strength following a power law rather than a linear law. The symmetrical circuit illustrated in Figure 1 contributes to the economy of the arrangement since it permits the coil to be closely spaced even though the closure be grounded, which latter condition for ease of mechanical construction is most desirable. The disadvantage of a nonsymmetrical circuit would be that the potential difference between the coil and the closure would be larger and would require greater spacing which would in turn require greater input power and, there being reasonable limit on the current, would require still greater potential. Even though the element to be heated is not grounded, the arrangement described is desirable in that power is saved. The symmetrical power system permits very close spacing of coils and ungrounded elements inasmuch as the potential difference between the coils and ground is materially lower than in the case of a power supply having one side grounded.

In Figure 6 there is shown the coil of my invention positioned in the Clark mechanism and showing my improved mechanism wherein the coils are adapted to move with the element to be heated, whereby heating is effected by electrical currents induced in a conducting element which is in motion, preferably in closed path. The coil 22 is positioned in a ring 46 of non-conducting material. A covering ring 47, is positioned over the coils 22 and is also formed of some non-conducting material such as "Bakelite". Openings 48 are provided in the ring 46 and similar openings 49 are provided in the cover 47. Air may be driven through these openings to cool the coil 22 and also to cool the under or decorated side of the closure 44 positioned in the field of the coil 22.

If the elements to be secured together require the application of pressure at any stage during the uniting operation, such as is desirable in the assembly of a sealing gasket with a crown cap shell, in which an adhesive forms the bonding agent, a suitable spring urged plunger 50 may be employed to urge the gasket 51 into engagement with the shell of the crown 44; the inner surface of the shell being preferably coated with adhesive lacquer or other heat convertible adhesive. It will be noted that the coil 22 is spaced closely to the element 44 to be heated and that the plunger 50 and the liner guide ring 52, which are grounded, are spaced in close relationship to the field of the heating coil. The use of a symmetrical circuit of the type disclosed in my copending application permits this construction without serious loss by heating of the machine parts.

The method of operating my device has been described in connection with the detailed disclosure of the apparatus and a restatement of the method will not, therefore, be given. It will suffice to state that the method includes the step of subjecting an element capable of being heated by induced electrical currents to a high frequency field while the element is in motion and moving the field and element together until the temperature in the element has risen to the proper degree.

From the foregoing disclosure it will be clear that my apparatus contemplates means for positioning an element in spaced relationship with respect to a coil for establishing a high frequency field and means for moving the coil and element to be heated while maintaining the coil and element in fixed, spaced relationship. It will be further observed that my mechanism includes a type of coil construction which permits a uniform rise in temperature over a restricted portion of an element to be heated and further contemplates a mechanism in which induction heating may be effected for a portion of the cycle followed by an element traveling in a closed path; energization of a coil for effecting such heating being effected through a commutator bar and a brush, one of which moves with respect to the other.

While I have illustrated and described the present preferred embodiment of my invention, it will be understood that my invention is not so limited but may otherwise be practiced and embodied within the scope of the following claims.

I claim:

1. In the method of securing two elements together, at least one of which is susceptible to heating by induced electrical currents and is relatively thin, and at least one of which carries a heat activatable bonding agent, the steps consisting in subjecting at least the element capable of being heated by induced electrical currents to a high frequency field while said element is in motion, and moving said field and element together until temperature is reached sufficient to activate said bonding agent.

2. In the method of securing two elements together, at least one of which is susceptible to heating by induced electrical currents and is relatively thin, and at least one of which carries a heat activatable bonding agent, the steps consisting in placing the element capable of being heating by induced electrical currents adjacent a coil capable of establishing a high frequency magnetic field, moving said element and said coil together, establishing a high frequency magnetic field of strength sufficient to induce heating currents in said element, moving said element and said field together until sufficient heat has been generated in said element to effect a temperature capable of activating said bonding agent, subjecting both elements to the heated bonding agent, and cooling the elements.

3. In the method of securing two elements together, at least one of which is susceptible to heating by induced electrical currents and is relatively thin, and at least one of which carries a heat activatable bonding agent, the steps consisting in supporting the element capable of being heated by induced electrical currents adjacent means capable of establishing a high frequency magnetic field, moving said element and said means together while maintaining said element and its support in relatively fixed position, establishing a high frequency magnetic field of strength sufficient to induce heating currents in said element, moving said element and said field together until sufficient heat has been generated in said element to effect a temperature capable of activating said bonding agent, destroying said field and maintaining said element and its support in relatively fixed position while cooling.

4. In the method of assembling laminated articles comprising groups of two elements by means of a heat activatable bonding agent, at least one of said elements of each group being capable of being heated by induced electrical currents and being relatively thin, the steps consisting in positioning a plurality of said elements capable of being heated by induced electrical currents in concentrated high frequency magnetic fields, moving said elements and said fields while maintaining said elements in their respective fields, continuing such movement until the temperature reached in said elements is sufficient to activate said bonding agent, and forming the laminated articles by cooling while the respective elements of each group are in contact with the heat activated bonding agent.

5. In the method of assembling crown closures including a metallic crown, a sealing liner and a heat activatable bonding agent carried by one of them, the steps consisting in supporting the crown adjacent means capable of establishing a high frequency magnetic field, moving the crown and said means together, continuing such movement while establishing a high frequency magnetic field of strength sufficient to induce heating currents in said crown, moving said crown and said field together until sufficient heat has been generated in said crown to effect a temperature capable of activating said bonding agent, pressing said liner into engagement with said bonding agent and continuing the application of pressure until a union is effected by activation of said bonding agent.

6. In the method of assembling crown closures including a metallic crown having head and skirt portions, a sealing liner, and a heat activatable bonding agent carried by one of them, the steps consisting in creating a high frequency electrical field, supporting said crown with the field threading the head thereof and moving said crown and field together until sufficient heat has been induced in said crown to activate the bonding agent without heating the skirt portion thereof to a deleterious degree.

7. In the method of assembling crown closures including a metallic crown having head and skirt portions, a sealing liner, and a heat activatable bonding agent carried by one of them, the steps consisting in creating a high frequency electrical field, supporting said crown with the field threading the head thereof, moving said crown and field together until sufficient heat has been induced in said crown to activate the bonding agent, and cooling the crown while maintaining the sealing liner and crown in engagement with the activated bonding agent.

8. In an apparatus for securing two elements together by generating heat in one of them by an inductive electrical action, a coil for establishing a high frequency magnetic field, a moveable support therefor, a stationary source of high frequency electrical current for energizing said coil, means for communicating high frequency current from said source to said coil at portions only along the path of movement of said coil, and means for deenergizing the communicating means as the coil is moving from one such portion to an adjacent portion.

9. In an apparatus for securing two elements together by generating heat in one of them by an inductive electrical action, a coil for establishing a high frequency magnetic field, a moveable support therefor, a stationary source of high frequency electrical current for energizing said coil, means for communicating high frequency current from said source to said coil including a segmental commutator, a brush for engagement therewith, and means for deenergizing the source when the brush is within arcing distance of a commutator segment with which it is not then in contact.

10. In an apparatus for securing two elements together, at least one of which is susceptible to heating by induced electrical currents, a high frequency generator for energizing a coil, said coil communicating with said high frequency generator through a segmental commutator and a brush, a source of low frequency current communicated to said generator and energizing the same and means for reducing the current supplied from the low frequency source to the high frequency generator at timed intervals coinciding with the transfer of said brush from one segment of the commutator to another.

11. In an apparatus for securing two elements together, at least one of which is susceptible to heating by induced electrical currents, a high frequency generator for energizing a coil, said high frequency generator including a quenched spark gap, and said coil communicating with said high frequency generator through a segmental commutator and a brush, a source of electrical current communicated to said generator and energizing the same and means for reducing the current supplied to said generator to a potential at which said quenched spark gas will not strike.

12. In a machine for securing two elements together by generating heat in one of them by induced electrical heating currents, a support for the element to be heated, a generally flat coil for establishing a high frequency field positioned in proximity to the element to be heated with the plane of the coil lying substantially parallel to the plane of the element, said coil being formed of convolute turns with the center being generally open to avoid self-heating, the number of turns being substantially equal along any section through the axis of the coil, means for energizing said coil, means for maintaining the element to be heated in fixed relationship with respect to the coil, and means for moving the coil with the element to be heated.

13. In a machine for inductively heating a generally flat surface of an element, a moveable support for the element to be heated, a spiral coil starting and terminating substantially on a line radial of the coil, having a generally open center to avoid self-heating of the inner turn, and formed of a generally flat conductor, the minimum dimension of which is disposed radially of the coil to provide spaces for cooling air to circulate between turns while maintaining a desired cross sectional area, means for energizing said coil, means for maintainng the element to be heated in fixed relationship with respect to the coil, and means for moving the coil with the element to be heated.

14. The combination with an apparatus for inductively heating a generally flat surface of an element, of a generally flat coil for establishing a high frequency magnetic field mounted upon a support, the plane of the coil lying substantially parallel to the plane of the support, a second support for positioning an element with a flat surface to be heated lying in a plane substantially parallel to the plane of the coil, and means for imparting coincident motion to the supports.

15. In the method of securing by the action of heat an element to be heated in a limited area only to another element by means of a heat activatable bonding agent, said first mentioned element being susceptible to heating by induced electrical currents and being relatively thin, and at least one of said elements carrying a heat activatable bonding agent, the steps consisting in establishing a high frequency field having a sectional shape substantially corresponding to the area to be heated, positioning the element capable of being heated in the field so as to be preferentiallly heated in the desired area and moving said field and said element together until the element reaches a temperature sufficient to activate the bonding medium.

16. In the method of assembling crown closures including a metallic crown, a sealing liner, and a heat activatable bonding agent, the steps consisting in creating a high frequency electrical field, positioning the metallic crown in the field to preferentially induce heating currents in the portion of the crown to be bonded to the liner, and moving said crown and field together until sufficient heat has been induced in the crown to activate the bonding agent.

17. The combination with an apparatus for securing two elements together by generating heat in one of them by induced electrical heating currents, means for establishing a high frequency field, a support therefor, means for imparting rotation to said support, means movable with said support and effective for positioning one of said elements in cooperative relationship with said establishing means, and pressure means for holding said elements together.

18. In an apparatus for securing two elements together by generating heat in one of them by an inductive electrical action, a plurality of coils for establishing a plurality of independent high frequency magnetic fields, means for supporting elements to be heated in said fields and means for imparting coincident motion to the coils and the supporting means.

19. In an apparatus for securing an element to a flanged circular disk, means for establishing a high frequency field of strength sufficient to heat said disk, said field being of greatest intensity at the central portion thereof, means supporting a flanged circular disk in the zone of said field establishing means in such position that said field will thread said disk with greatest intensity in the central portion thereof and means for imparting coincident motion to the field establishing means and the disk supporting means.

20. In an apparatus for securing an element to a circular disk, a circular coil for establishing a high frequency magnetic field, supporting means for positioning a circular disk in axial alignment with said coil and means for imparting coincident motion to the coil and supporting means.

21. In an apparatus for securing two elements together by generating heat in one of them by inductive electrical action, a plurality of groups of coils, for establishing independent high frequency magnetic fields, each group of which is composed of a series of coils electrically connected, a support upon which said coils are mounted for rotation, means for supporting elements to be heated in said fields, a stationary source of high frequency electrical current for energizing said coils, means for communicating current from said source to one group of coils while another group remains deenergized, and means for imparting coincident motion to the coils and the supporting means.

22. In an apparatus for securing two elements together by generating heat in one of them by inductive electrical action, a plurality of groups of coils for establishing independent high frequency magnetic fields, each group of which is composed of a series of coils electrically connected, a support upon which said coils are mounted for rotation, means for supporting elements to be heated in said fields, means for imparting coincident motion to the coils and the supporting means, a stationary source of high frequency electrical current for energizing said coils and means for coincidentally energizing a group of coils when another previously energized group is deenergized, whereby the load of said current source remains substantially constant.

23. In an apparatus for securing two elements together by generating heat in one of them by an inductive electrical action, means for establishing a high frequency magnetic field, means for supporting an element to be heated within the field established by said means and means for coincidentally moving the field establishing means and the supporting means.

24. In the method of securing two elements together, at least one of which is susceptible to heating by induced electrical current and is relatively thin, and at least one of which carries a heat activatable bonding agent, the steps consisting in sequentially feeding a series of groups of said elements to a moving support, simultaneously subjecting the thin element of each group in said series to a high frequency field while said elements are in motion, moving said fields and elements together until a temperature is reached sufficient to activate said bonding agent, simultaneously ceasing heating action on said series, and thereafter sequentially removing said element from said support.

EMIL R. CAPITA.

CERTIFICATE OF CORRECTION.

Patent No. 2,184,282.   December 26, 1939.

EMIL R. CAPITA.

It is hereby certified that error appears in the printed specification of the above numbered patent requiring correction as follows: Page 2, second column, line 24, for the word "radiators" read coils; page 4, second column, line 2, claim 2, for "heating" read heated; page 5, first column, line 64, claim 11, for "gas" read gap; and second column, line 18, claim 13, for "maintainng" read maintaining; line 44, claim 15, for "preferentiallly" read preferentially; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.